US009492937B2

(12) United States Patent
Bailie

(10) Patent No.: US 9,492,937 B2
(45) Date of Patent: Nov. 15, 2016

(54) AUTOMATIC CREATION OF APPLIQUE CUTTING DATA FROM MACHINE EMBROIDERY DATA

(71) Applicant: BriTon Leap, Inc., Albuquerque, NM (US)

(72) Inventor: Brian D. Bailie, Albuquerque, NM (US)

(73) Assignee: BriTon Leap, Inc., Albuquerque, NM (US)

( * ) Notice: Subject to any disclaimer, the term of this patent is extended or adjusted under 35 U.S.C. 154(b) by 0 days.

(21) Appl. No.: 14/812,188

(22) Filed: Jul. 29, 2015

(65) Prior Publication Data

US 2016/0031108 A1 Feb. 4, 2016

Related U.S. Application Data

(60) Provisional application No. 62/030,724, filed on Jul. 30, 2014.

(51) Int. Cl.
*G06F 19/00* (2011.01)
*B26D 5/00* (2006.01)
*D05B 19/04* (2006.01)

(52) U.S. Cl.
CPC ............... *B26D 5/005* (2013.01); *D05B 19/04* (2013.01)

(58) Field of Classification Search
CPC .................... B26D 5/005; D05B 19/02; D05B 19/04; D05B 19/081; D05C 5/00; D05C 5/02
USPC .......................................... 700/134, 136–138
See application file for complete search history.

(56) References Cited

U.S. PATENT DOCUMENTS

| | | | | |
|---|---|---|---|---|
| 1,741,620 A | | 12/1929 | Fixler | |
| 3,226,732 A | | 1/1966 | Zerilli | |
| 4,920,902 A | | 5/1990 | Takenoya et al. | |
| 5,430,658 A | | 7/1995 | Divinsky et al. | |
| 5,438,520 A | * | 8/1995 | Satoh | D05B 19/08 700/138 |
| 5,668,730 A | | 9/1997 | Tsonis et al. | |
| 5,740,055 A | * | 4/1998 | Iwata | D05B 19/08 112/475.19 |
| 5,771,173 A | | 6/1998 | Tsonis et al. | |
| 6,600,966 B1 | | 7/2003 | Bailie | |
| 6,633,794 B2 | | 10/2003 | Bailie | |
| 6,732,008 B2 | | 5/2004 | Bailie | |
| 6,944,605 B2 | | 9/2005 | Bailie | |
| 6,968,255 B1 | * | 11/2005 | Dimaridis | D05B 19/08 700/138 |
| 7,457,683 B2 | | 11/2008 | Bailie | |

(Continued)

OTHER PUBLICATIONS

Cacciola, F., "A Survey of Polygon Offseting Strategies," http://fcacciola.50webs.com/Offseting%20Methods.htm, printed Jul. 29, 2014, 7 pages.

*Primary Examiner* — Nathan Durham
(74) *Attorney, Agent, or Firm* — Richard H. Krukar; Kermit D. Lopez; Luis M. Ortiz

(57) ABSTRACT

Using an existing embroidery design that has been created for applique, data is automatically created for a cutting machine, which will cut the applique. Currently, the user currently has to cut these by hand—a labor intensive process or use a custom die that can be expensive. The process only requires that the applique steps in the sewing sequence are labeled as such. Generally, the applique steps are so labeled in order for the design creator to be able to let the sewer know what they are doing.

20 Claims, 8 Drawing Sheets

(56) References Cited

U.S. PATENT DOCUMENTS

| | | | | |
|---|---|---|---|---|
| 7,882,645 | B2 | 2/2011 | Boring | |
| 8,557,078 | B2 | 10/2013 | Marino et al. | |
| 2007/0032899 | A1* | 2/2007 | Mizuno .................. | D05B 19/08<br>700/138 |

* cited by examiner

AUTOMATIC CREATION OF APPLIQUE CUTTING DATA FROM MACHINE EMBROIDERY DATA

CROSS REFERENCE TO RELATED APPLICATIONS

This patent application claims the priority and benefit of U.S. provisional patent application 62/030,724, entitled "Automatic Creation of Applique Cutting Data from Machine Embroidery Data", filed on Jul. 30, 2014 and which herein incorporated by reference in its entirety.

TECHNICAL FIELD

Embodiments are related to sewing, embroidery, embroidery machines, embroidery design software, and automated cutting machines.

BACKGROUND

Applique is often done by labeling the color steps with the words "Applique" and either "Position" or "Material". The steps always have to be in order. The first sewn section is the Position. This sewing puts an outline on the project being embroidered. This outline is the location of the material applique which that will be applied to a project cloth at this point in time. The next sewing step is the "Material" which can vary in type of stitch, such as single run, double (out and back), or even zigzag. This sewing anchors the material of the applique to the project. The next step a sewer must do is to cut the applique around the outside of the stitches sewn by the "Material" step. They do this by hand using a pair of scissors generally. Once the excess fabric is removed, the sewing is completed to finish the project.

Alternatively, a sewer can run the outline of the design on some other item such as paper. This allows them to place the paper with the outline on the cloth that is to be the applique, allowing the sewer to cut the paper and cloth together. This saves loss of registration by the machine during the sewing process.

Yet another alternate method is to print out a precise template of the applique position color using a normal printer and software that is calibrated for this purpose. All of these methods require the user to hand-cut the applique cloth.

A different process also exists, wherein certain dies have been made to cut cloth. AccuQuilt.com has typical examples. The dies using manual or pneumatic or electrical means can cut the cloth. This means the cloth must be applied using a sewing machine, not with embroidery.

U.S. Pat. No. 6,600,966 titled "SOFTWARE PROGRAM, METHOD AND SYSTEM FOR DIVIDING AN EMBROIDERY MACHINE DESIGN INTO MULTIPLE REGIONAL DESIGNS" issued to Brian D. Bailie on Jul. 29, 2003. U.S. Pat. No. 6,600,966 is herein incorporated by reference in its entirety for its teachings of embroidery techniques, embroidery file formats, embroidery file reading/writing/modification, use of grids, analysis software applied to embroidery, identifying and using embroidery regions, and automated and computerized embroidery.

U.S. Pat. No. 6,633,794 titled "SOFTWARE PROGRAM AND SYSTEM FOR REMOVING UNDERLYING STITCHES IN AN EMBROIDERY MACHINE DESIGN" issued to Brian D. Bailie on Oct. 14, 2003. U.S. Pat. No. 6,633,794 is herein incorporated by reference in its entirety for its teachings of embroidery techniques, embroidery file formats, embroidery file reading/writing/modification, use of grids, analysis software applied to embroidery, identifying and analyzing individual stitches in their context in an embroidery design, and automated and computerized embroidery.

U.S. Pat. No. 6,732,008 titled "SOFTWARE PROGRAM AND SYSTEM FOR EVALUATING THE DENSITY OF AN EMBROIDERY MACHINE DESIGN" issued to Brian D. Bailie on May 4, 2004. U.S. Pat. No. 6,732,008 is herein incorporated by reference in its entirety for its teachings of embroidery techniques, embroidery stitches, embroidery file formats, embroidery file reading/writing/modification, use of grids, analysis software applied to embroidery, identifying and analyzing individual stitches in their context in an embroidery design, and automated and computerized embroidery.

U.S. Pat. No. 6,944,605 titled "EXPERT SYSTEM AND METHOD FOR CREATING AN EMBROIDERED FABRIC" issued to Brian D. Bailie on Sep. 13, 2005. U.S. Pat. No. 6,944,605 is herein incorporated by reference in its entirety for its teachings of embroidery techniques, stitches, fabrics, analysis. Further reasons for incorporating U.S. Pat. No. 6,944,605 in its entirety is its teaching of creating and applying rules in the context of embroidery, its teaching of analysis for offering recommendations to human operators, its approach to embroidery design flow, and its parametric selection teachings.

U.S. Pat. No. 7,457,683 titled "ADJUSTABLE EMBROIDERY DESIGN SYSTEM AND METHOD" issued to Brian D. Bailie on Nov. 25, 2008. U.S. Pat. No. 7,457,683 is herein incorporated by reference in its entirety for its teachings of embroidery techniques, embroidery stitches, embroidery file formats, embroidery file reading/writing/modification, analysis software applied to embroidery, identifying and analyzing individual stitches in their context in an embroidery design, and automated and computerized embroidery.

Prior art references having different authorship are now presented. The references are also incorporated by reference in their entirety for their teachings of certain aspects of embroidery, embroidery techniques, and the automation of aspects of embroidery processes.

U.S. Pat. No. 4,920,902 titled "Automatic pattern sewing machine" issued to Takenoya et al. on May 1, 1990. It is herein incorporated by reference for its teachings of a machine that automatically sews patterns, teaching of applique techniques, teachings of pattern data, and teachings of automatic or assisted modification of the pattern data.

U.S. Pat. No. 1,741,620 titled "Hemstitched applique work and process of making the same" issued to Fixler on Dec. 31, 1929. It is herein incorporated by reference in its entirety for its teachings of stitches, embroidery, and embroidery knowhow.

U.S. Pat. No. 8,557,078 titled "Applique printing process and machine" issued to Marino et al. on Oct. 15, 2013. It is herein incorporated by reference in its entirety for its teachings of automatically producing an applique based on a printing type process, for its teachings of certain embroidery/applique techniques, and for its teaching of cutting cloth/materials for appliques.

U.S. Pat. No. 5,438,520 titled "Method of creating applique data" issued to Satoh et al. on Aug. 1, 1995. It is herein incorporated by reference in its entirety for its teachings of applique techniques, applique data, generation and manipulation of applique data, and for the machinery and equipment (embroidery machine, computer, cutter, etc.) that can be used in association with designing and creating appliques.

U.S. Pat. No. 7,882,645 titled "System and method for making an applique" issued to Boring on Feb. 8, 2011. It is herein incorporated by reference in its entirety for its teachings of applique techniques, applique templates, and applique design.

U.S. Pat. No. 3,226,732 titled "Applique article and method of manufacture" issued to Zerilli on Jan. 4, 1966. It is herein incorporated by reference in its entirety for its teachings of applique techniques, applique layers, and applique design, cutting, stitching and application.

Three related patents are also incorporated herein by reference in their entirety. U.S. Pat. No. 5,430,658 titled "METHOD FOR CREATING SELF-GENERATING EMBROIDERY PATTERN" issued to Davinsky et al. on Jul. 4, 1995. U.S. Pat. No. 5,668,730 titled "METHOD FOR AUTOMATICALLY GENERATING CHAIN STITCHES" issued to Tsonis et al. on Sep. 16, 1997. U.S. Pat. No. 5,771,173 titled "METHOD FOR AUTOMATICALLY GENERATING A CHENILLE FILLED EMBROIDERY STITCH PATTERN" issued to Tsonis et al. on Jun. 23, 1998. These three patents largely have the same inventors and are included by reference herein in their entireties for their teachings of developments and refinements in defining, outlining, and filling embroidery shapes. They are also incorporated by reference for their teachings of automatic or algorithmic generation of chain stitch outlines, of automatic or algorithmic generation and of embroidery patterns, of computer aided design applied to embroidery, of embroidery techniques and processes, and for their detailed teachings of stitch types, properties, and uses.

A document titled "A Survey of Polygon Offseting Strategies" by Fernando Cacciola was incorporated into the filing of U.S. provisional patent application 62/030,724 and is thereby also herein incorporated by reference in its entirety. It is incorporated herein for its teachings of techniques for offsetting polygons and for other transformations and operations.

Applique is a popular technique and embroidery designs for applique exist in abundance. Systems and methods for saving the sewers time by producing properly cut out designs are needed.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

Aspects of the embodiments address limitations and flaws in the prior art by analyzing machine embroidery data to automatically produce cutting data that a cutting machine can interpret to cut out the applique. An applique data file specifies an applique design and contains sewing data. The sewing data can include sewing vectors and jump commands. The sewing vectors specify stitches as, for example, movements, stitch points, or needle penetrations. The jump commands split the sewing vectors into subsections. For example, one subsection can be an applique outline while a number of other subsections can be holes or openings in the applique outline. An embroidery machine can read and interpret the applique data file to thereby stitch a pattern onto a piece of cloth. A cutting machine can read the cutting data automatically created by the embodiments disclosed herein and cut the applique out of a piece of cloth.

Aspects of the embodiments can be a non-transitory memory containing program instructions readable by a computer for performing certain operations. Other aspects of the embodiments can be the steps or operations performed in automatically creating the cutting data from the applique data file.

It is, therefore, an aspect of the embodiments to access an applique data file and to create lists of sewing vectors. If there is only one subsection, then there is only one list. If a jump command splits the sewing vectors into two or more subsections, then there can be two more or lists.

It is also an aspect of the embodiments to normalize the lists. Normalizing the lists by discarding certain sewing vectors or data such as tie-off data, double stitches, and other sewing artifacts do not affect the applique outline that is to be cut.

It is a further aspect of the embodiments to close the lists. It is possible for the endpoint on a list to be far enough from the start point that one or more additional sewing vectors are needed to close the list so that it defines a closed outline.

It is a yet further aspect of the embodiments that an outline contains holes. The dosed paths specified by the lists specify at least one outline and may specify a number of holes for applique designs that contain openings. The embodiments can determine that a list is an outline and that another list is a hole. The embodiments can also create objects that include an outline list and one or more hole lists for holes inside the outline.

It is yet another aspect of the embodiments that the outlines are inflated by a positive amount to make them slightly larger and for the holes to be inflated by a negative amount to make them slightly smaller.

It is still yet another aspect of the embodiments to simplify the lists by removing points using certain known algorithms such as the Douglas-Peucker algorithm or any of its readily available derivatives. The outline can then be further simplified by fitting them to Bezier outlines using common fitting technique such as Newton-Raphson least squares fitting techniques or other line and curve fitting algorithms that are known in the arts of graphing or computer graphics.

It is a still yet further aspect of the embodiments to create a preview that can be seen by a person. An image can be produced by copying a first bitmap into the image sections outside of the applique outline and inside any holes in the applique. A second bitmap can be copied into image sections inside the applique outline and outside any holes in the applique.

An alternative embodiment can use the applique design to draw vectors onto a bitmap. The bitmap should be sized such that it is large enough to include all the vectors and also large enough that the shortest vector is at least two pixels long. The bitmap can then be conditioned to produce a better outline. Thinning algorithms and skeletonizing algorithms can condition the bitmap. The applique outline can then be traced by finding a first pixel in the outline and then simply following along the outline. Cutting data can be produced from the applique outline traced in the image. Those familiar with image processing and digital image manipulation are familiar with a number of common thinning an skeletonizing algorithms.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION OF THE INVENTION

The particular values and configurations discussed in these non-limiting examples can be varied and are cited merely to illustrate embodiments and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, and computer program products and data structures according to embodiments of the invention. It will be understood that certain blocks of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a non-transitory computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
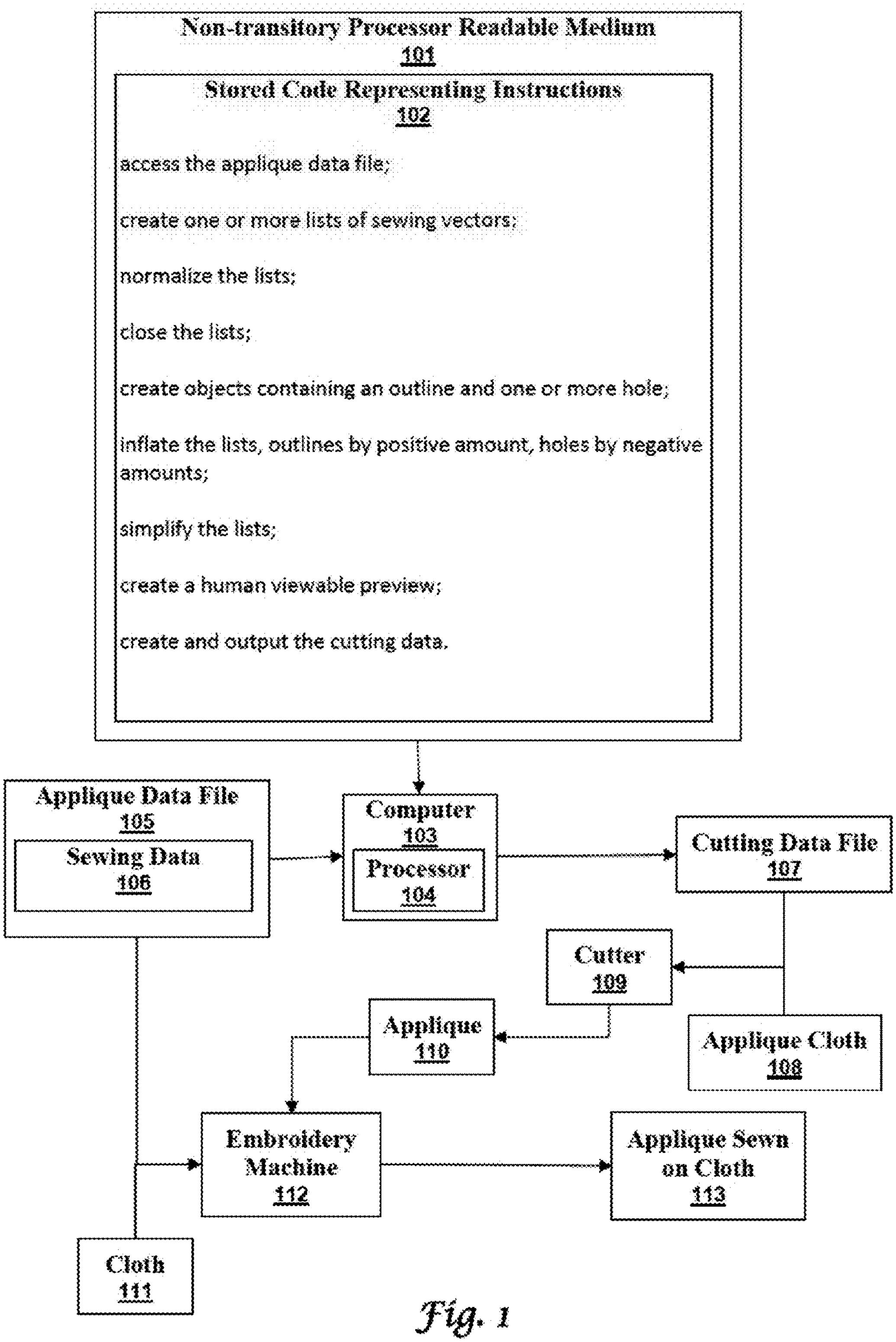
FIG. 1 illustrates a high level diagram of a processor executing stored instructions to create a cutting data file from an applique data file in accordance with aspects of the embodiments.

FIG. 1 illustrates a high level diagram of a processor 104 executing stored instructions 102 to create a cutting data file 107 from an applique data file 105 in accordance with aspects of the embodiments. A non-transitory processor readable medium 101 contains the stored code representing instructions 102 that the processor 104 running in computer 103 accesses. The processor 104 accesses applique data file 105 and processes the sewing data 106 to produce cutting file 107. A cutter 109 provided with applique cloth 108 can process the cutting data file 107 to thereby cut out an applique 110. An embroidery machine 112 provided with cloth 111 and applique 110 can process applique data file 105 to thereby sew the applique onto the cloth 113.

Figure 2:
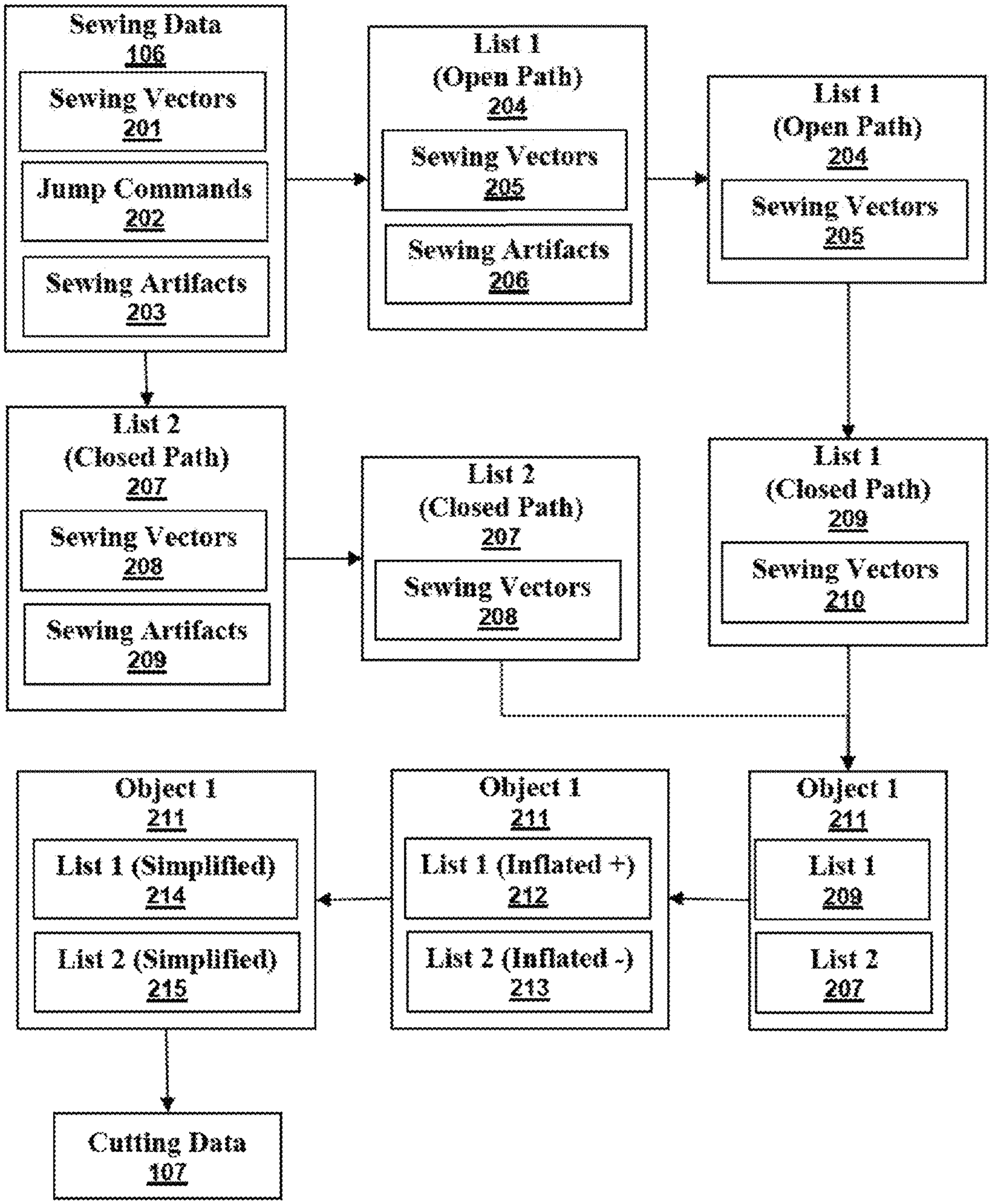
FIG. 2 illustrates a high level block diagram of data transformations and processes to create a cutting data file from an applique data file in accordance with aspects of the embodiments.

FIG. 2 illustrates a high level block diagram of data transformations and processes to create a cutting data file 107 from an applique data file in accordance with aspects of the embodiments. The applique data file contains sewing data 106. The sewing data contains sewing vectors 201 and jump commands 202. There are also sewing artifacts 203 in the sewing data 106. Examples of sewing artifacts 203 include data for tie-offs, double stitching, and sewing paths that cross in on themselves without stopping.

Two lists 204, 207 are created from the sewing data 106 because, in this example, the sewing data 106 contains a jump command 202. The sewing vectors 205 before the jump command can go into list 1 204 while the sewing vectors 208 after the jump command can go into list 2 207.

In practice, more jump commands can result in more lists being created. Furthermore, list 1 204 and list 2 207 do not contain jump commands.

The lists 204, 207 are normalized to remove sewing artifacts 206, 209. Analysis indicates that list 2 defines a closed path, meaning that the first and last points in the list of sewing vectors are closer than a predetermined threshold. Analysis indicates the list 1 204 does not define a closed path. List 1 204 is amended to produce list 1 209 containing sewing vectors 210 wherein the path is closed by adding additional sewing data to the list to thereby close the path. For example, a stitch can be added that connects the first and last points.

List 1 209 and list 2 207 are analyzed and it is determined that the closed path defined by sewing vectors 208 lies inside of the closed path defined by sewing vectors 210. List 1 209 therefore defines an outline while list 2 207 defines a hole inside the outline. List 1 209 and list 2 207 are combined into object 1 211 because the hole is inside the outline. Object 1 211 can then be inflated by inflating the outline by a positive amount and inflating the hole by a negative amount. In the example, list 1 209 has been inflated by a positive amount into list 1 212 while list 2 207 has been inflated by a negative amount into list 2 213.

Inflation is a common geometric term which is slightly different than scaling. It is also known as polygon offsetting and is well known in the art. Where there are 'Holes' the inflation uses a negative value, thus reducing the size of the hole.

Object 1 can be simplified to include simplified lists such as list 1 214 and list 2 215. Simplification is the elimination of extra points in the sewing data. There are a number of well-known algorithms such as Douglas-Peucker and its derivatives that eliminate extra points. The outline and hole can also be fitted to Bezier outlines using common fitting techniques such as Newton-Raphson or least squares fitting techniques.

Object 1 can then be transformed into cutting data because the object's data is forward moving, non-repetitive, and possibly spline or cubic Bezier format that is useful to a cutter.

Figure 3:
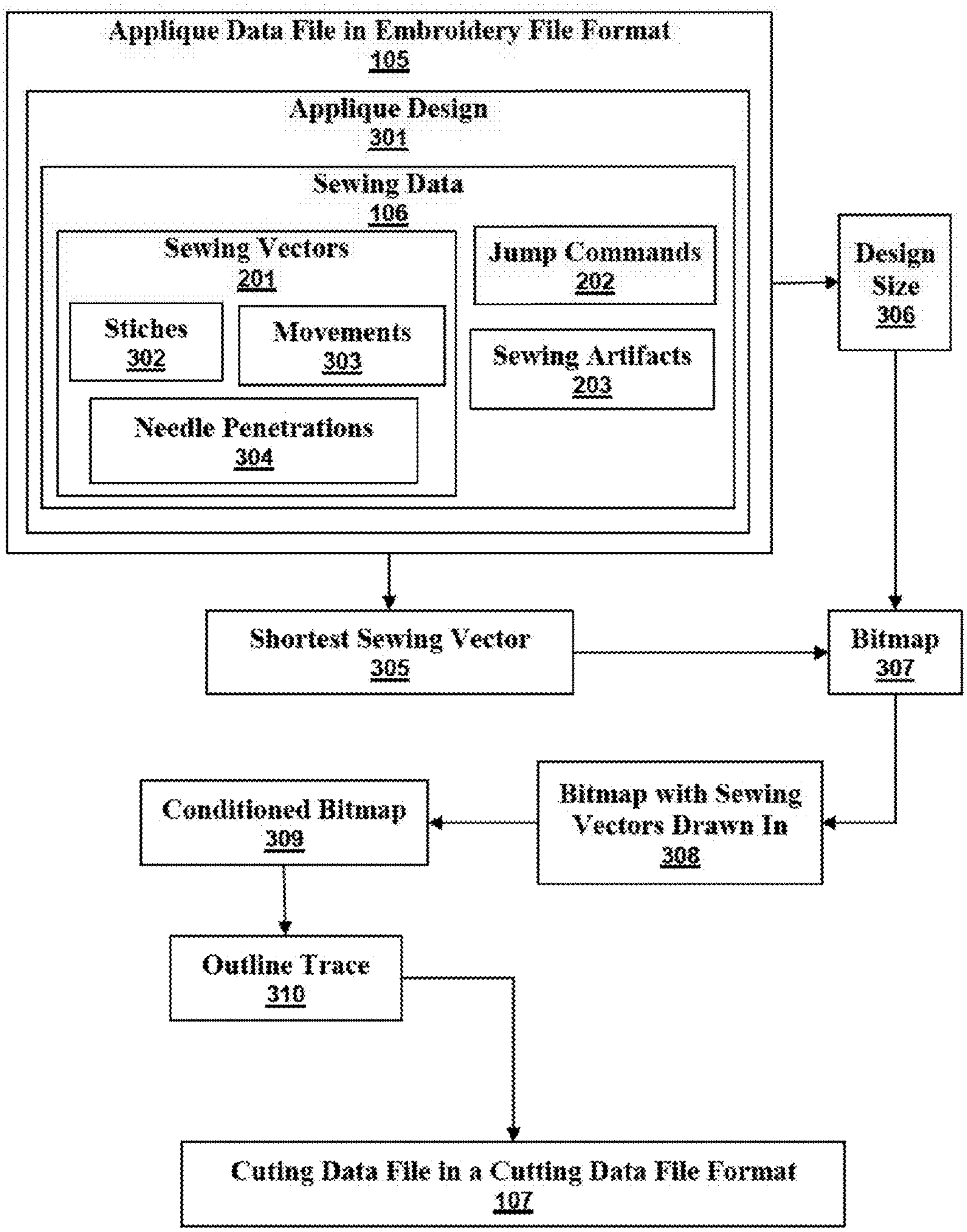
FIG. 3 illustrates a high level block diagram of data transformations and processing of a bitmap to create a cutting data file from an applique data file in accordance with aspects of the embodiments.

FIG. 3 illustrates a high level block diagram of data transformations and processing of a bitmap 307 to create a cutting data file 107 from an applique data file 105 in accordance with aspects of the embodiments. The applique data file 105, in an embroidery file format, contains an applique design 301 with sewing data 106. The sewing data can contain sewing vectors 201, jump commands 202, and sewing artifacts 203. Exemplary sewing vectors 201 include stitches 302, movements 303, or needle penetrations 304.

A bitmap 307 is created that is sized at least as large as the design size 306 and such that the shortest sewing vector 305 is at least two pixels long. The sewing vectors are then drawn onto the bitmap 308. The bitmap can be conditioned 309 by applying a thinning algorithm or a skeletonizing algorithm. The bitmap can then be traced to find a point on the outline and then the outline traced 310 to produce a list, as discussed above. The list is closed if analysis finds that it is open. The cutting data 107 can then be produced from the list.

The embodiments can consist of the usual apparatus of a computer, a program, and an embroidery machine. The software can look for sections of the design with appropriate labels. It also allows the user to select a section for applique. The software uses the sewing data (stitches) which consist of a series of relative or absolute movements (vectors or stitch points or needle penetrations) to create an outline. That outline is then saved in a format that is useful to a cutting machine. Cutters, similar to the vinyl cutters used by sign shops everywhere, have been adapted to the purpose of cutting fabric recently. Currently, the cutters force the user to draw the outlines for the cut using a manual drawing process—using bezier or point input modes. In some cases, they can scan in a picture and auto-trace an outline. These are separate sets of steps which are prone to terrible inaccuracy when making the outline.

The process for converting is not a simple matter of converting formats of the sewing vectors into cutting vectors. The stitch data for an applique position may contain a set of vectors that handle multiple outlines, including holes in outlines, as well as sewing requirements such as tie-offs which are extra stitches that ensure the thread is working and able to be cut between sections. What's required is forward-moving-only data that forms dosed polygon outlines.

Exemplary descriptions of steps and instructions for performing the process are now provided.

The stitch data may contain both normal sewing vectors and "jump" commands. These jumps are non-sewing movement commands. When the process sees these commands in the data, it can separate the data into subsections, organized as linked lists with each subsection containing the sewing vectors between two jump commands. The end cases, obviously, are the sewing vectors from the stitch data start to the first jump command and the sewing vectors from the last jump command to the end of the stitch data. Note that here linked lists are used in the interests of a simple explanation whereas, in practice, different data structures such as arrays, trees, hash tables, key-value pairs, etc., can be used to similar effect.

The lists, aka subsections, are now processed into normalized data, which removes certain sewing artifacts.

For each list:

Advance a few stitches into the data, looking for a Euclidean distance of travel away from the start point, (2 mm best current) until a new point is found. Once that is reached, the skipped stitch data in between can be discarded. This process is referred to as 'skipping tie-off data' and is used throughout. This Euclidean distance and any of the other tolerances or distance discusses below can be user specified parameters having default values or can be constant values. Note, Euclidean distance is specified here as it has proven useful although other distance measures such as Mahalanobis, Manhattan, etc., can be used in appropriate circumstances.

It is entirely possible for the path to continue around its required outline and past the start point, and it frequently does. The process therefore scans the data iteratively and tracks its path. When and if the path comes back within a tolerance, the closing distance, of the start point, the shape is assumed closed at that point, and that section of data is saved for later processing. The closing distance is typically a distance from the current stitch end to the start point. If found, the stitch whose end is within the closing distance is the closing stitch for that particular shape.

If the length of the design, meaning the total length of all vectors is below a threshold, or the number of useable points is too small (a line, not a polygon), then the list is discarded. The data may be double-stitched, wherein the stitches travel to an endpoint, then reverse direction of travel to come back at or near the start point. Therefore the process scans the data looking for double-stitches and removes the double-back section. The process also discards any data beyond the closing stitch.

It is possible that the data at this point does not form a properly closed path and there is no closing stitch. The path is closed in the usual manner of adding a new tail point between the closing stitch and the start point which closes the outline.

It is also possible that a stitch other than a single or double stitch may exist in the stitch data. This can be determined by analyzing the points in the data and seeing how many are repeated within a certain tolerance, usually 0.2 mm. If there is a plurality of these, an alternate method must be used on this data to get a set of points that run in a forward direction. This can be accomplished with an alternate process, such as:

Alternate Method:

Create a 2-color (e.g., black and white) bitmap that will represent the image, using a pixel ratio that is known so that the vectors will have meaningful scale when drawn such as the shortest vector having a length of two or possibly more pixels. Draw the stitches into the bitmap. Apply a thinning algorithm to the bitmap which will provide sensible single-pixel data. Scan the bitmap for a starting pixel and follow the outline, tracing the path. Thinning algorithms are suggested here because they have been used with success. Other well-known image processing algorithms can similarly skeletonize an image or bitmap.

These steps are well known in all areas of computer graphics, but not used in the embroidery art for this purpose. Once a plurality of pixels has been discovered, the results are checked against the same steps as above for length and closure. If it is long enough, but open, then it is closed.

Alternate Method:

The user might use an image of the stitch data and draw on top of it using ordinary computer drawing tools to create an outline from scratch. This is also useful if the user wants to add an applique section to a design that currently does not have one, but is a good candidate (visually) for one.

Sequencing the resultant lists.

Now that we have a plurality of lists containing clean forward-moving-only vector data (cutters don't like a lot of reversals), we can now sort them into outlines and holes.

For each point-list, analyze the remaining point-lists to see if they wholly contain this list. This is achieved using the Winding Number rule, or any similar technique. Lists which are not wholly contained are separated into a group of 'outline' lists, and holes are left in the list of point-lists.

Next each hole is analyzed to see which outline contains it, and they are grouped together. This group is an 'object'. Each object has a single outline and possibly a plurality of holes. There may be several objects.

Optionally:

As applique cloths will need to be attached to the cloth being embroidered, there are always stitches provided to do so in the applique design. These stitches are known as the 'Material' stitches. These stitches are either automatically generated or hand-laid by the artist who is creating the design. Often times the automatic creation of these material stitches uses the exact same form and size as the outline of the applique. This process can work if the applique is hand cut by the sewer after the applique has been sewn. However, if the applique is cut in advance, the material stitching may not penetrate the applique cloth, as the applique cloth will be the same size as the stitching. Therefore at the direction of the user, or automatically, the outline of the applique shape may be inflated before cutting. Making this decision can be done as simply as examining the size of the applique and the size of the material stitching, and if they are within a small tolerance (1-2 mm) then the inflation needs to occur.

Inflation is a common geometric term which is slightly different than scaling. It is also known as polygon offsetting and is well known in the art. Where there are 'Holes' the inflation uses a negative value, thus reducing the size of the hole.

Optional, depending on the needs of the cutter device:

Now, each point-list within each object is processed by simplification—thus eliminating extra points which can make the cut difficult. The algorithm used is one created by Douglas-Peucker or any readily available derivative. Then the outlines are fitted to Bezier outlines using a common fitting technique such as Newton-Raphson least squares fitting techniques.

Finally each object's data, now in forward-moving, non-repetitive, possibly spline or cubic Bezier format is ready for output to a cutter. The cutters each have a format for their data. A typical example is the HPGL.plt format, which is widely used, although there are many proprietary formats too.

Additionally:

Once a cut outline (cutline) has been created, it is possible to store this cutline alongside the sewing data in the apparatus. This adds a novel benefit of being able to allow the user to select an image, or for the software to create one, simulating fabric of a given or user-chose color, which image is then used in the display to the user for visualization of the applique. The process of display uses the cutline, which is always a closed shape as described, and a pair of bitmaps which will be used to represent the image. The first image is called a bitmap mask and this image is filled with a background color of known value. Then the cutline is drawn on the mask with a different color. The cutline is always at least one pixel smaller on each edge in its representation on the bitmap than the bitmap size.

A loop is run for each pixel in the bitmap and an evaluation is made—if the pixel is background colored data, a determination of that point and whether or not it is inside the actual object is made. Inside is determined true if the point is within the outline, and not within any holes. If it is determined that the point is inside the object shape, then a seeded fill operation is performed, which is a color that fills the inside area, and that color is not background. At the end of the loop the mask bitmap contains a binary image of pixels which are either background or contained in the object.

The next step is to use an image, represented by another bitmap, and placed over the mask bitmap, and a display bitmap. Where the mask bitmap contains drawn pixels, the matching pixel from the image is copied into the display.

In a previous step, the input image may be selected by the user, and certain transforms applied, including brightness, contrast, sepia tone, hue and saturation adjustments for the purpose of matching other colors and even editing may be performed. All of which steps are common to the computer graphics art, and included as a step in the process.

It is not assumed that masked bitmaps are novel. Just the implementation of them in the place is described. There are also transforms that can be applied, too numerous to mention, but by example: rotation, morphing, and alpha channel.

Another Addition:

Prior art (Bailie) has disclosed a method for removing overlapping stitches from a design. This improves the design by removing density which results in damage to equipment, downtime, and even simple production time. The new cutline and masked bitmap allows the process to be extended in such a way that the applique material is now an additional component of the occlusion—causing other stitches which are previously sewn to be unnecessary. Their removal is very useful for the same reasons just mentioned.

An additional item is useful: Tagging the sewing data which are Position and Material runs as NOT to be removed is useful. This stitch data which would be removed during the process normally can now be exempted from the removal. The reason is that Position and Material runs are required where applique materials will be overlapped, according to the designer of the embroidery design. In this case, the stitches that are not part of Position and Material stitches should be removed, and would be, as the subsequent applique would cover them.

Aspects related to automatic global underlay for embroidery designs:

It is often desired to place embroidery on towels or any other items that are composed of a cloth with a texture known as pile. This poses difficulty for the embroiderer as the process of embroidery on that kind of cloth requires a substantial number of stitches to flatten out that cloth before the design is sewn. If the underlying stitches are insufficient, the design will have the texture of the cloth protruding above the embroidery and/or making the texture of the embroidery irregular.

As most designs are not created with this intended purpose, it would be beneficial if there were a way to automatically add such an underlay to any design. This can be accomplished using (the usual apparatus) plus a set of bitmaps, and stitch-creation process.

Figure 4:
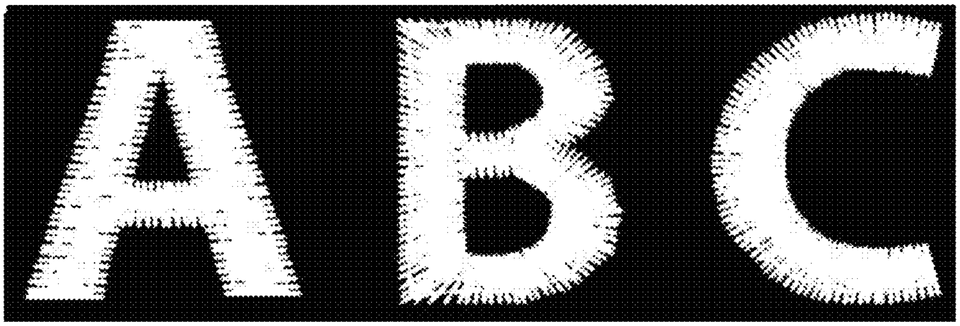
FIG. 4 illustrates an image with irregular edges in association with automated global underlay in accordance with aspects of the embodiments.

First a masked bitmap is created. It is filled with no color (black). Then, using a single color, the design is drawn into it. This image when rendered usually has a very irregular edge, one not pleasing to the eye. Due to the nature of stitch data, the bitmap is rendered using LineTo and MoveTo commands, which leave ">" shaped gaps all along the edges of adjacent lines of stitching as can be seen in FIG. 4.

Figure 5:
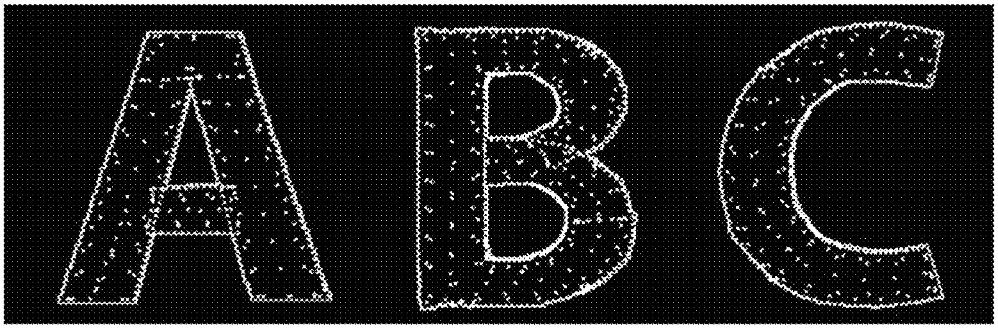
FIG. 5 illustrates an image of needle penetrations in association with automated global underlay in accordance with aspects of the embodiments.

If a path-following process around the image is used, these "<" or ">" shaped dents are formed. Nonetheless, a set of traces around the drawn design must be the start of the process. However, additional drawing in the form of a different color, only at points of needle penetration can be performed as shown in FIG. 5.

Figure 6:
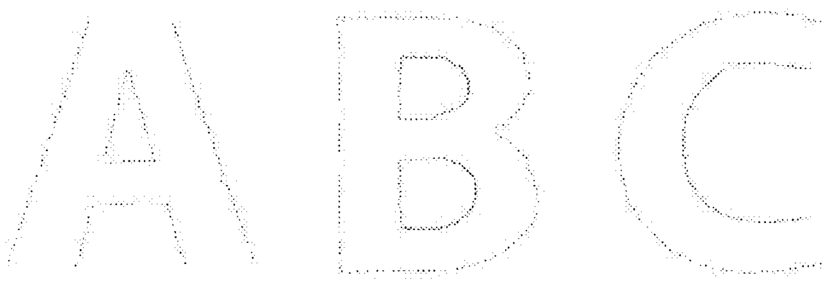
FIG. 6 illustrates the image of FIG. 5 after triad filtering in association with automated global underlay in accordance with aspects of the embodiments.

This allows the outline to have more intelligent data and thus the resultant paths can have the pixels between the penetrated points removed. This makes the outline more regular and pleasing. Further improvement can be made by filtering triads of stitch points which are close together, often the result of embroidery short-stitching, which is commonly used as a method to turn the angle of lines of stitches. FIG. 6 is an image of such a filtered image.

Next a simplification of the outline can be made and conversion into Bezier or other outline form thus made.

As there are likely to be a plurality of outlines, it is important to create objects with outlines and holes, as described previously.

Figure 7:
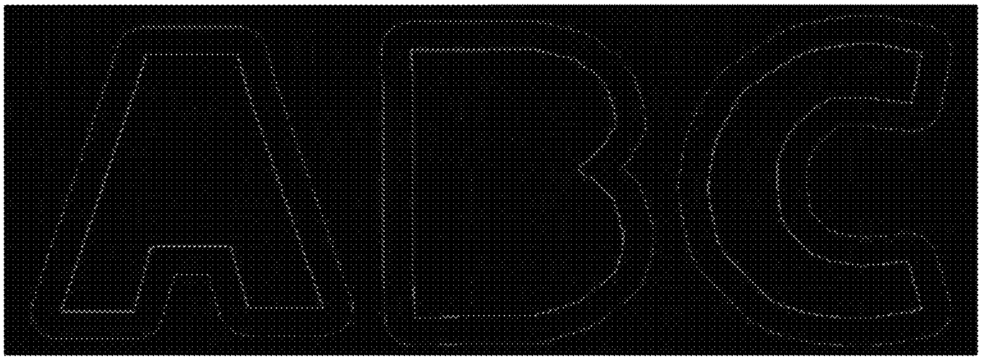
FIG. 7 illustrates the image of FIG. 6 after simplification of the outline and inflation in association with automated global underlay in accordance with aspects of the embodiments.

Once those outlines exist, a global underlay can be achieved by first, inflating the size of the shapes to some useful value (best practice is 3 mm) as seen in FIG. 7.

Then those shapes can be passed to a tatami fill generator which is well defined in the art (best practice for Terry cloth is 3.5 mm stitch length, 1.5 mm line density). The output of the fill generator can then be sequenced as the earliest-sewn data in the design. Thus with a single user action, the process can adapt any design to the desired nappy cloth. Additionally, using the prior art, any stitch data from the original design which is interpreted as underlay may now be removed, as it has been replaced with a superior set of data.

Figure 8:
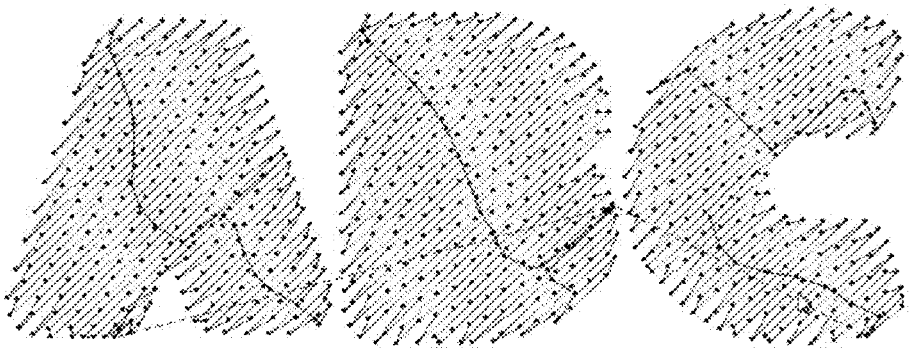
FIG. 8 illustrates a tatami fill of the image of FIG. 7 in association with automated global underlay in accordance with aspects of the embodiments.
Figure 9:
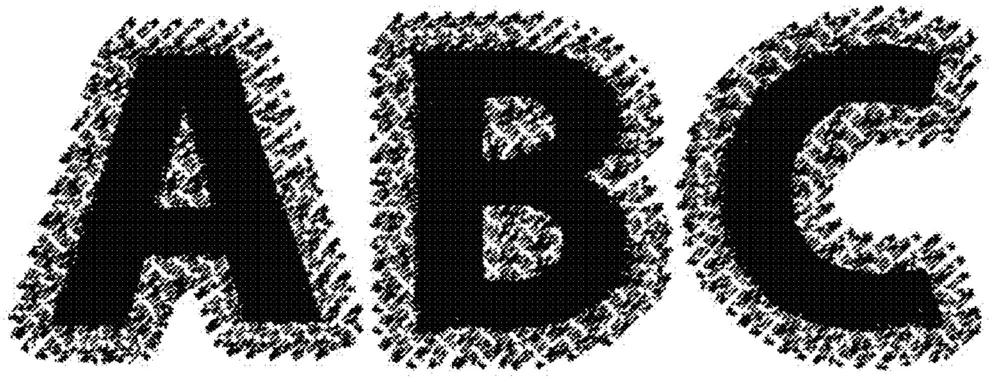
FIG. 9 illustrates the tatami filled design of FIG. 8 with embroidered letters in association with automated global underlay in accordance with aspects of the embodiments.

FIG. 8 illustrates a tatami fill pattern while FIG. 9 illustrates letters embodied over a tatami filled area.

Figure 10:
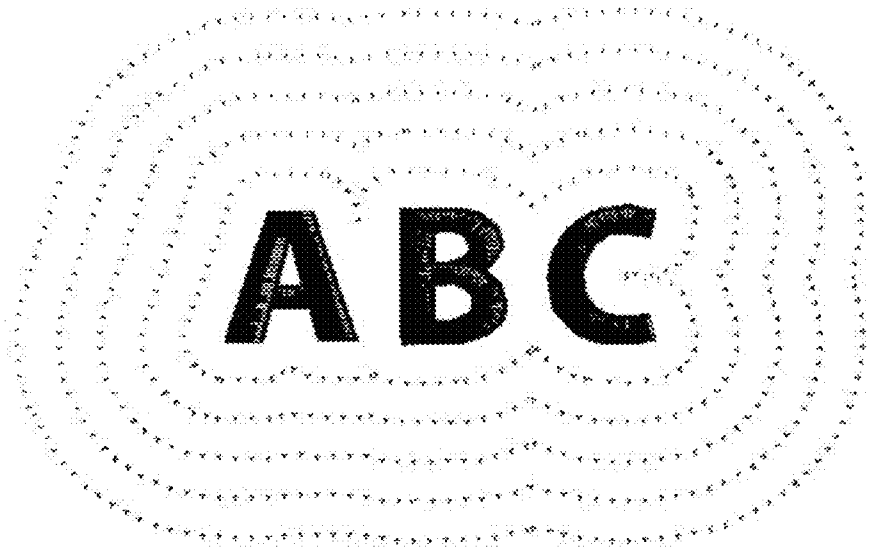
FIG. 10 illustrates an echo quilting design with embroidered letters in association with automated echo quilting in accordance with aspects of the embodiments.

Aspects related to automatic echo quilting for embroidery designs:

Using a similar process to creating a global underlay, wherein the outline and hole data is created for any embroidery design, we can achieve a different effect. The concept of echo quilting is not new to graphics, but in embroidery such items are manually created by a skilled artist. FIG. 10 illustrates an echo quilting design with embroidered letters.

Outlining stitches with new stitches can be done by taking the objects and handing them to a run stitch generator (or any stitch generator, such as satin, bean stitch, etc.). Further, if we optionally discard any holes, we can then expand the outlines using known polygon inflation techniques to create a single or plurality of outlines which 'echo' around the design. This is commonly used by quilters to provide stability to a quilt, using a set of running stitches known as echo quilting. It appears as ripples would in a pond. Further, as each embroidery is constrained by the hoop which will be used to create it, we can cause the echo lines to terminate within the bounds of the hoop, and add tie-off and jump to other echo lines as needed. The user of the software could control the distance and stitch type of the echo lines. Additionally, multiple designs within a hoop could have their outlines inflated together, producing a more visually complex result as the echo patterns interfere with each other, and each echo line can have other stitch actions applied, such as decorative motifs played on the line, etc.

Aspects related to automatic drop shadow embroidery:

Using a similar process to creating a global underlay, wherein the 'outline' and 'hole' data is created for any embroidery design, we can achieve a different effect. The concept of drop shadow is not new to graphics, but in embroidery such items are manually created by a skilled artist.

In this process, we take a complete set of outlines as proposed above and offset them in a manner described by a user, having little skill and requiring only a visual interest, and offset, inflate with rounding acute corners, monochromatize, and then use a graphical subtraction which created a resulting set of objects that can then have stitches applied. The subtraction includes steps for discovering intersections between the original and copied image, then discarding overlapped regions, however, the drop shadow is compensated such that its shape penetrates the original design by a small amount which is useful in embroidery to prevent gapping in designs, where the background shows through. The user inputs an offset of a vector, containing by definition a distance and an angle. This angle is then used as the angle for a tatami or other patterned fill, well known in the art.

Aspects related to automatic stipple embroidery:

Prior art exists, which has flaws that this overcomes.

1.) Using a similar process to creating a global underlay, wherein the 'outline' and 'hole' data is created for any embroidery design, we can achieve a different effect.

or

2.) Using a user-defined area which typically includes an outer shape, which may be an embroidery hoop area, or some other defined polygon, and optionally an internal area of exclusion such as a design or plurality of designs placed in the hoop area, there is a need to automatically stitch down lines in a pseudo-random order known in the art as stippling. There are several variations on the pattern, but one requirement is near-uniform distance between lines of stitching. And they may not cross.

Prior art has been shown with fractals (Tsonis . . . , Pulse Microsystems, Mississauga, Canada), but that approach has a failure in that the fractal shape does not match the original shape, and thus there are dipped sections causing the stitch to either jump from section to section (undesirable because of time sewing and trimmer [a mechanical device in the machine] wear) or false paths which are too close.

Other prior art—Brother JP—uses a method where the pattern can be trapped and requires an exit to find its way out, which causes the lines of stitching to be closer together than optimal.

These embodiments solve that using maze theory and algorithms, with adaptations for embroidery.

A plurality of tessellated shapes, which may or not be identical in shape, is laid over the desired embroidery region at potentially a user-defined angle, with added spacing between the tessellations, defining graphical cells in a matrix. Each cell has data with it describing its center and the position and state of each edge, along with each edge's availability of an adjacent neighbor. Cells with fewer than two edges that are completely contained in the outline are discarded from the matrix.

As there is a minimal irregularity sometimes desired in stippling, the centers may be randomly offset by some small vector.

Shapes which are partially contained are flagged as such, along with the edges that are available for use in the design (those contained in the shape).

An initial starting point is defined, either randomly or by the user. The software then follows an algorithm (Drunkard's Path example) for selecting and adding cells to the sequence, labeling used cells as it goes, thereby ensuring that a single path can be traced into each and every useable cell in the matrix. Due to the nature of randomization added to the algorithm, the path is always different, although the seed used can be stable or user-altered to change the path. To ensure that the accidental use of continuous forward moves does not occur, the randomizer is presented with a reduced solution set where advancing forward in the same direction as the last move occurred happens. This makes the path turn frequently.

Once the path has been established, there needs to exist a return route in order to achieve the desired effect. For this reason, the actual entry and exit of each cell has its points set at evenly spaced intervals along the edge where travel exists. Thus, the path always forms a closed shape, running twice through each and every cell.

Where the path enters a cell is stable, as that maintains spacing between lines of stitching. Instead of following through the cell, however, the stitches run around the edges of the cell toward the exit edge. This provides additional shape and visual interest to the pattern. This is made possible by the cell spacing, which allows the edges not to touch.

Additional adjustment is made to the points discovered as the path travels through the cells. For each cell where the path enters and then exits, without going through another cell, this cell is flagged for shape adjustments.

The nodes of each entry, exit, and edge travel are set into a list, each given a Bezier handle set (or spline). In the case of Bezier, the handles may be adjusted in length and rotation by small amounts to create imperfect curvature, similar to what a skilled sewer would do by hand. Additional effects can be the lack of curvature and/or the erasure of nodes based on patterns. This produces a random, yet geometrically pleasing image.

Further, the resultant shape can now be taken as an outline and passed to other stitch generating apparatus. In this way motifs (or any other ornamentation) can be added.

A variation of this exists and is known in the industry as "Vermicelli Stitching." This is similar in that it is random movements of small vector length and those movements are allowed to clip against the actual outlines. In this case we take the original stipple path and allow it to enter any cells that even touch the outline. A similar operation is performed, yet with a simple rule system for internal deformation of each cells travel route. The result is very similar to a manual process that is extremely time-consuming.

Figure 11:
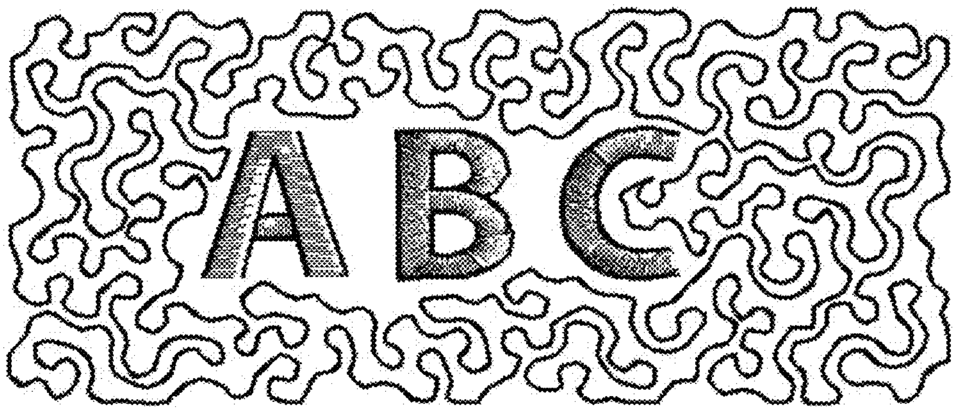
FIG. 11 illustrates an automatically generated pattern around embroidered letters in association with automated stippling in accordance with aspects of the embodiments.

FIG. 11 illustrates an automatically generated pattern around embroidered letters in association with automated stippling in accordance with aspects of the embodiments.

Figure 12:
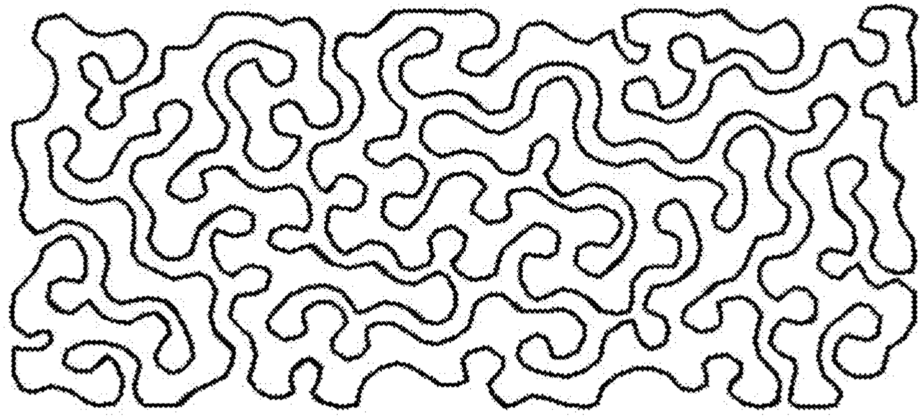
FIG. 12 illustrates an automatically generated pattern from a "Drunkard" algorithm in association with automated stippling in accordance with aspects of the embodiments.

FIG. 12 illustrates an automatically generated pattern from a "Drunkard" algorithm in association with automated stippling in accordance with aspects of the embodiments.

Figure 13:
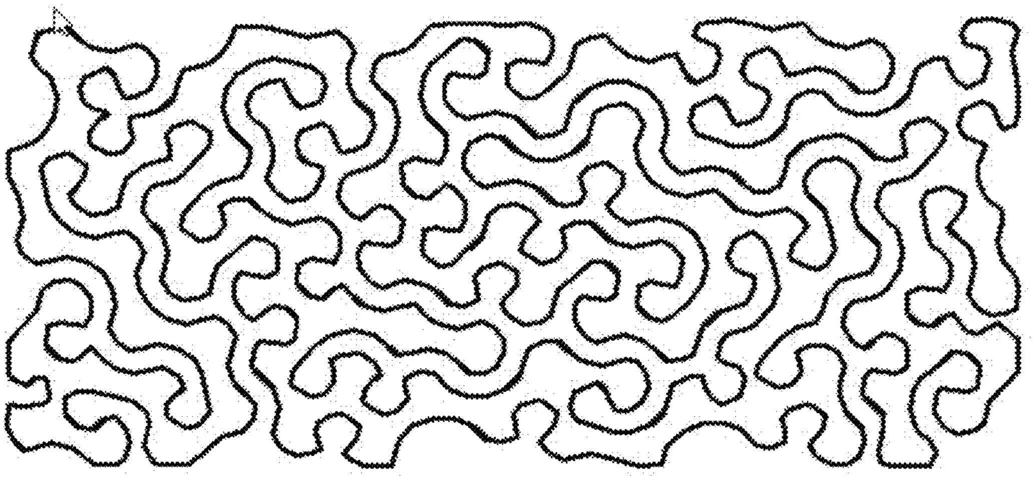
FIG. 13 illustrates an automatically generated less randomized version of the "Drunkard" pattern of FIG. 12 in association with automated stippling in accordance with aspects of the embodiments.

FIG. 13 illustrates an automatically generated less randomized version of the "Drunkard" pattern of FIG. 12 in association with automated stippling in accordance with aspects of the embodiments.

Figure 14:
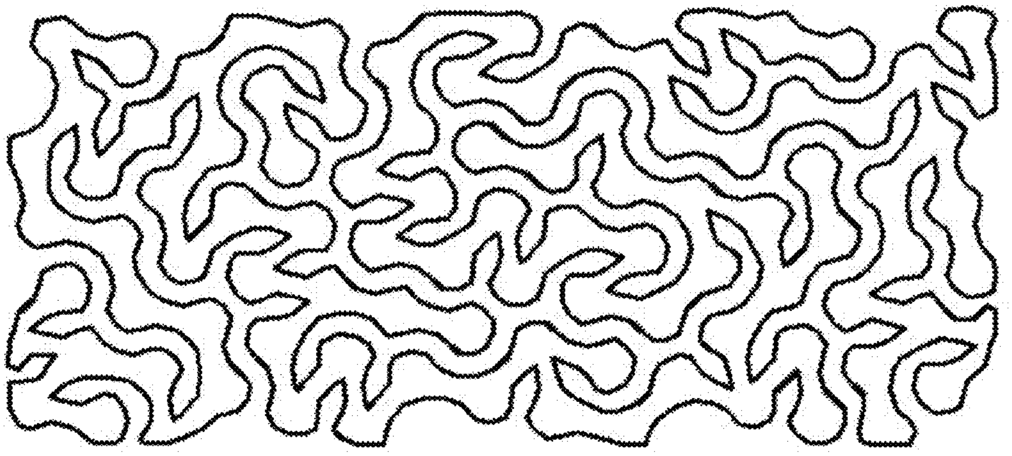
FIG. 14 illustrates an automatically generated "Leafy" version of the "Drunkard" pattern of FIG. 12 in association with automated stippling in accordance with aspects of the embodiments.

FIG. 14 illustrates an automatically generated "Leafy" version of the "Drunkard" pattern of FIG. 12 in association with automated stippling in accordance with aspects of the embodiments.

Figure 15:
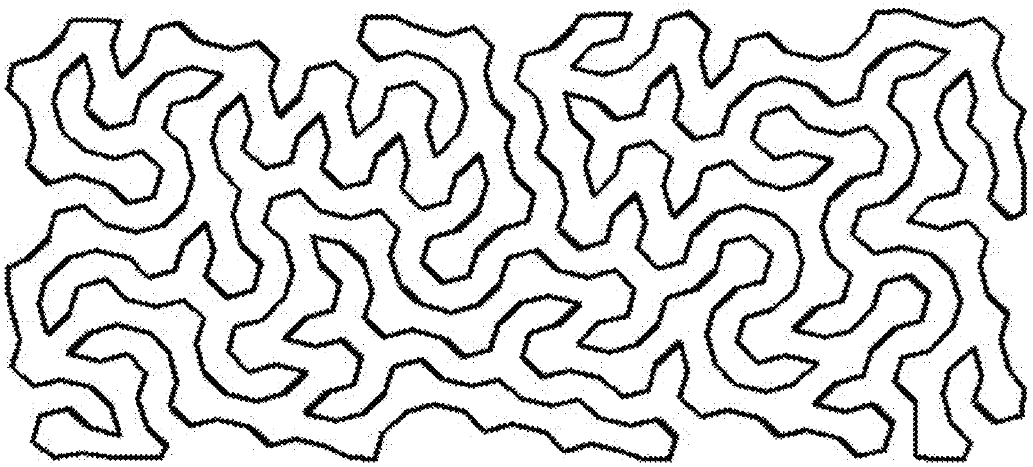
FIG. 15 illustrates an automatically generated "Geometric" version of the "Drunkard" pattern of FIG. 12 in association with automated stippling in accordance with aspects of the embodiments.

FIG. 15 illustrates an automatically generated "Geometric" version of the "Drunkard" pattern of FIG. 12 in association with automated stippling in accordance with aspects of the embodiments.

It will be appreciated that various of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for producing a cutting data file from sewing data in an applique data file specifying an applique design wherein the applique data file is in an embroidery file format readable by an embroidery machine and wherein the cutting data file is in a cutting data format readable by a cutting machine, the method comprising:

- obtaining the applique data file, wherein the applique data file comprises sewing data comprising a series of sewing vectors, wherein the applique data file is interpretable by the embroidery machine to create a stitched outline, and wherein zero or more jump commands separate the sewing vectors into one or more subsection comprising a first subsection;
- creating a first list of sewing vectors from the first subsection;
- normalizing the first list by removing at least one sewing artifact;
- analyzing the first list to determine if it describes a first closed path;
- closing the first list if it does not describe the first closed path such that the first list does describe the first closed path; and
- creating the cutting data file wherein the cutting data file is based at least in part on the first list.

2. The method of claim 1 further comprising:

- creating a second list of sewing vectors wherein the one or more subsection comprise a second subsection;

normalizing the second list by removing at least one sewing artifact;

analyzing the second list to determine if it describes a second closed path;

closing the second list if it does not describe the second closed path such that the second list does describe the second closed path; and wherein the cutting data file is based at least in part on the second list.

3. The method of claim 2 further comprising:

determining that the first closed path surrounds the second closed path; and creating a first object comprising the first list and the second list.

4. The method of claim 3 further comprising inflating the first list by a positive value.

5. The method of claim 4 further comprising inflating the second list by a negative value.

6. The method of claim 5 further comprising:

a step for simplifying the first list; and a step for simplifying the second list.

7. The method of claim 6 comprising:

obtaining a first bitmap and a second bitmap;

producing an image wherein the image is scaled to include the first object;

mapping the first object onto the image;

filling the image with the first bitmap;

filling those areas inside the first closed path and outside the second closed path with the second bitmap; and displaying the image to a person.

8. The method of claim 7 further comprising:

providing cloth to a cutting machine;

providing the cutting data file to the cutting machine;

activating the cutting machine such that the cutting machine cuts the cloth in accordance with the cutting data file; and wherein the sewing vectors comprise at least one of a movement, a stitch point, or a needle penetration.

9. The method of claim 6 further comprising:

providing cloth to a cutting machine;

providing the cutting data file to the cutting machine; and activating the cutting machine such that the cutting machine cuts the cloth in accordance with the cutting data file.

10. A method for producing a cutting data file from sewing data in an applique data file specifying an applique design, wherein the applique data file is in an embroidery file format readable by an embroidery machine, wherein the sewing data specifies a plurality of stitches and wherein the cutting data file is in a cutting data format readable by a cutting machine, the method comprising:

finding a shortest sewing vector in the applique data file;

creating bitmap comprising a plurality of pixels, wherein the pixels are all initially of a first color, wherein the bitmap is sized to include the applique design and wherein the bitmap is sized such that the shorted vector is at least two pixels in length;

drawing the stitches onto the bitmap in a second color to thereby draw an outline into the bitmap;

applying a step for conditioning the bitmap;

finding a first pixel of the second color;

generating cutting data by following the outline; and producing the cutting data file wherein the cutting data file comprises the cutting data.

11. The method of claim 10 wherein the step for conditioning the bitmap comprises a thinning algorithm.

12. The method of claim 10 wherein the step for conditioning the bitmap comprises a skeletonizing algorithm.

13. A non-transitory processor-readable medium storing computer program code representing instructions to cause a processor to perform a process for producing a cutting data file from sewing data in an applique data file specifying an applique design wherein the applique data file is in an embroidery file format readable by an embroidery machine and wherein the cutting data file is in a cutting data format readable by a cutting machine, the processor-readable program code comprising program instructions, the program instructions comprising:

program instructions for obtaining the applique data file, wherein the applique data file comprises sewing data comprising a series of sewing vectors, wherein the applique data file is interpretable by the embroidery machine to create a stitched outline, and wherein zero or more jump commands separate the sewing vectors into one or more subsection comprising a first subsection;

program instructions for creating a first list of sewing vectors from the first subsection;

program instructions for normalizing the first list by removing at least one sewing artifact;

program instructions for analyzing the first list to determine if it describes a first closed path;

program instructions for closing the first list if it does not describe the first closed path such that the first list does describe the first closed path; and program instructions for creating the cutting data file wherein the cutting data file is based at least in part on the first list.

14. The non-transitory processor-readable medium of claim 13 further comprising:

program instructions for creating a second list of sewing vectors wherein the one or more subsection comprise a second subsection;

program instructions for normalizing the second list by removing at least one sewing artifact;

program instructions for analyzing the second list to determine if it describes a second closed path;

program instructions for closing the second list if it does not describe the second closed path such that the second list does describe the second closed path; and wherein the cutting data file is based at least in part on the second list.

15. The non-transitory processor-readable medium of claim 14 further comprising:

program instructions for determining that the first closed path surrounds the second closed path; and program instructions for creating a first object comprising the first list and the second list.

16. The non-transitory processor-readable medium of claim 15 further comprising:

program instructions for inflating the first list by a positive value; and program instructions for inflating the second list by a negative value.

17. The non-transitory processor-readable medium of claim 16 further comprising:

program instructions for simplifying the first list; and program instructions for simplifying the second list.

18. The non-transitory processor-readable medium of claim 17 comprising:

program instructions for obtaining a first bitmap and a second bitmap;

program instructions for producing an image wherein the image is scaled to include the first object;

program instructions for mapping the first object onto the image;

program instructions for filling the image with the first bitmap;

program instructions for filling those areas inside the first closed path and outside the second closed path with the second bitmap; and program instructions for displaying the image to a person.

19. The non-transitory processor-readable medium of claim 18 further comprising:

program instructions for providing cloth to a cutting machine;

program instructions for providing the cutting data file to the cutting machine; and program instructions for activating the cutting machine such that the cutting machine cuts the cloth in accordance with the cutting data file.

20. The non-transitory processor-readable medium of claim 13 wherein normalizing the first step comprises producing series of points along and outline.

* * * * *